June 9, 1936.  T. B. TYLER  2,043,786

MEANS FOR ACCELERATING CLUTCH ENGAGEMENT

Filed June 3, 1932   2 Sheets-Sheet 1

INVENTOR
Tracy Brooks Tyler
BY
ATTORNEY

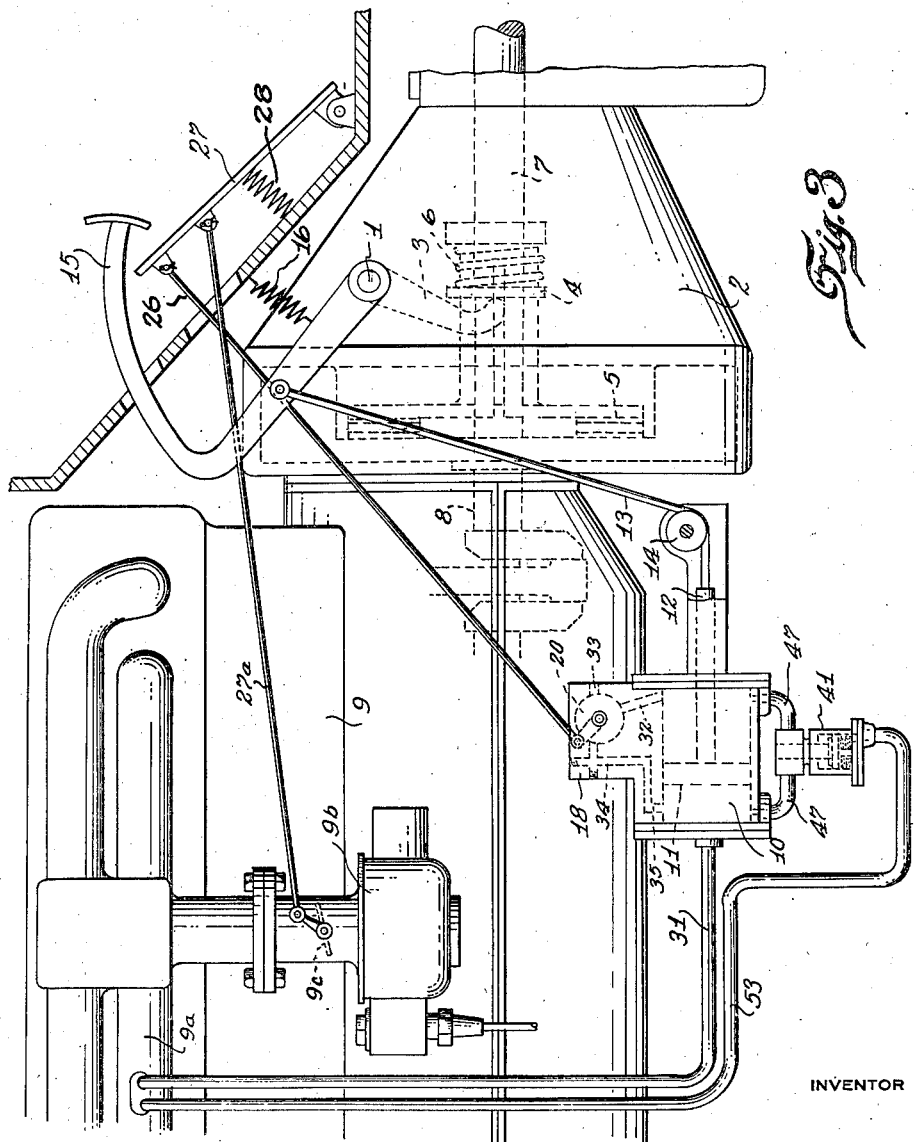

Patented June 9, 1936

2,043,786

UNITED STATES PATENT OFFICE 2,043,786

MEANS FOR ACCELERATING CLUTCH ENGAGEMENT

Tracy Brooks Tyler, Detroit, Mich., assignor to The Monopower Corporation, Detroit, Mich., a corporation of Michigan Application June 3, 1932, Serial No. 615,210

5 Claims. (Cl. 192—.01)

This invention relates to clutch actuating means, and more particularly to automatically operable means for operating clutches, especially those used with automobiles.

The speed of actuation, for clutch engagement of conventional actuators, since generally limited by the proportions of the parts, is predetermined and is not capable of rapid increase, when desired. It sometimes is necessary to engage the clutch more rapidly than is normally the case, and this invention aims to provide means for this purpose.

The invention further aims to construct such means in such a fashion that it is operable, for rapid clutch engagement, by the fuel feeding means (throttle pedal or lever) normally manipulated by the driver of the vehicle when he desires sudden starting movement of the vehicle.

A further object is to provide a novel quick acting mechanism, designed to operate automatically upon a sudden variation of engine suction, due to sudden throttle opening.

Further aims and objects of the invention will be readily apparent upon reference to the following detailed description and to the appended drawings, in which—

Figure 1:
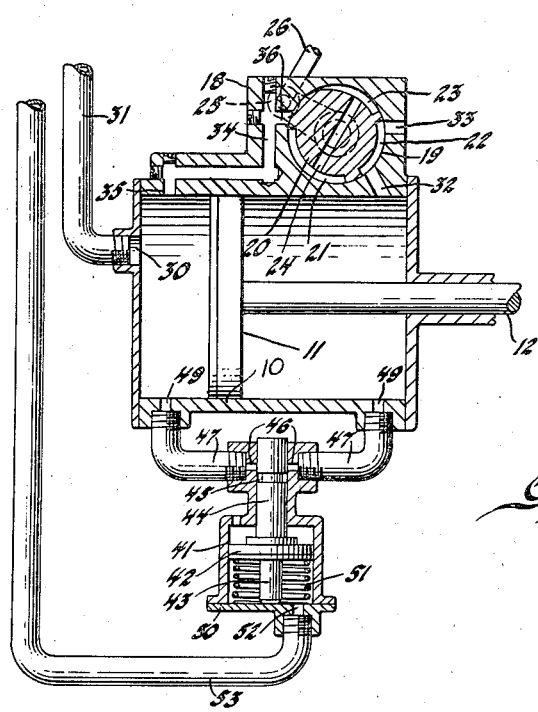
Figure 2:
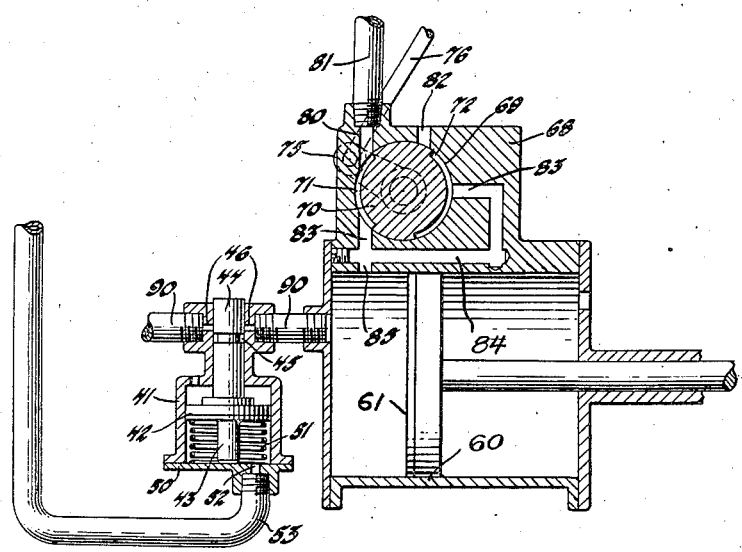

Figures 1 and 2 show two different forms of actuators, each of which is equipped with a device embodying the invention, and Fig. 3 is a fragmentary side elevation of an automobile engine having the present invention assembled thereon.

The clutch actuator of Figures 1 and 3 includes a cylinder 10 containing a plunger 11 connected by a rod 12 and a cable 13, passing over a pulley 14, to a clutch actuating element or pedal 15, there being a spring 16 for opposing clutch disengagement movement of the pedal, and tending to maintain the latter in clutch engaged position. The pedal 15 is mounted on a clutch shaft 1 journalled in a clutch casing 2, the shaft having a lever 3 engaging a slidable collar 4. The collar 4 is connected to a clutch 5 and is engaged by a spring 6 which normally holds the clutch in engaged position. The clutch 5 is of conventional construction and is employed in the manner well known in the art to connect a driven shaft 7 to the engine shaft 8, the latter forming part of an engine 9 having an intake manifold 9a and a carburetor 9b having a throttle valve 9c.

Integral with the wall of cylinder 10 is a valve body 18 provided with a chamber 19 in which is a rotary valve 20, the latter having relief channels 21, 22 and 23, as shown, of which 21 and 23 are connected by a transverse bore 24. The valve is provided with an external crank 25 (in dotted lines) connected by a link 26 to an actuator manipulator pedal 27 that is connected to the carburetor 9b by a connector 27a. A return spring 28 is provided to normally hold the actuator pedal 27 in its raised, inoperative position.

Cylinder 10 has a low pressure port 30 connected to the intake manifold 9a of the automobile motor 9 by a conduit 31. The cylinder further has a high pressure port 32 which opens into the valve chamber 19 and which may be connected to the atmosphere through a port 33, also opening into the chamber 19. The cylinder is further connected to the valve chamber by a passage 34, opening into the cylinder through a port 35, and opening into the valve chamber 19 through a port 36.

The construction thus far described constitutes a complete actuator and operates as follows: When the engine is running, suction in the intake manifold, causes the plunger 11 to move to pull the pedal 15 downwardly and to the left, to disengage the clutch 5. As soon as the operator depresses the manipulator pedal 27, to accelerate the vehicle the valve 20 will be rotated counterclockwise, whereupon the pressure behind plunger 11 will be relieved, the pressure medium bleeding out through port 32, relief 21, bore 24, relief 23, port 36, passage 34, and port 35, to the low pressure side of the cylinder, thus permitting the spring 16 to retract clutch pedal 15 and to cause clutch engagement.

It will be seen that in the structure thus far described, the speed of clutch engagement depends upon the speed with which the pressure medium can bleed out through the valve body ports and passages. Accordingly, the speed of clutch engagement is limited by the dimensions of the valve parts, and since in emergencies it may become desirable to have the clutch reengage much more quickly than at its normal maximum speed, that is to say much more quickly than is permitted by the valve body parts, it therefore appears desirable to provide means for creating an auxiliary bleeder passage, such means being normally inoperative, but available for operation in emergencies. Further, since such means is to be used in emergencies, it should be and preferably is so constructed that it is operable in a natural fashion, that is to say, by the natural action of a vehicle operator when an emergency confronts him. The means disclosed complies with this desideratum, since it is operated by the throttle pedal or lever which is generally advanced quickly and firmly by the operator when he desires the vehicle to move ahead very quickly, as in an emergency.

The quick starting means above referred to and operable to provide an auxiliary bleeder path when the engine throttle is opened quickly, includes a casing 41 containing a piston 42 having a stop 43 at one end, and a plunger 44 at the other, the latter having an annular groove 45 which, when aligned with casing ports 46, serves to create a communicating path between the ports and the pipes 47 to which they are connected, these pipes being connected to ports 49 in opposite ends of the actuator cylinder 10. The path through pipes 47, ports 46 and groove 45 is so dimensioned as to be of greater capacity than the main bleeder path, for reasons to be observed below.

The piston 42, and with it the plunger 44, is normally pulled down, towards casing cap 50, against the influence of compression spring 51, when the engine is running, idle or under load, by the intake manifold suction operable through a port 52, connected to the intake manifold 9a or to any other part of the engine suction line by a pipe 53. So pulled down, the plunger serves to close the auxiliary bleeder path through pipes 47, and since this is the normal position of the plunger, the auxiliary bleeder path is normally closed.

However, when the operator, reacting to an emergency desires to have the car move quickly, opens the throttle quickly, the engine suction will be destroyed momentarily, in a well known manner which needs no description here, and the spring 51 will raise the plunger quickly to cause groove 45 to be aligned with ports 46 and to open the auxiliary bleeder path.

With this path open the pressure medium in the actuator cylinder 10 will escape very quickly and the clutch will be engaged very quickly, far more quickly than is normally the case.

It will be seen that the construction shown permits clutch engagement at normal speeds, when the throttle is opened in a normal fashion, but also permits clutch engagement to occur rapidly when the throttle is opened rapidly, as in an emergency. Further it will be seen that in order to have the clutch engage rapidly the operator would need do only that which he would naturally do, namely advance the throttle or lever quickly.

The quick-acting means disclosed in Figures 1 and 3 and described above might well be used with a second form or actuator, such as is disclosed in Figure 2. This form of actuator includes a cylinder 60, a plunger 61 that is to be connected to a clutch pedal such as the pedal 15 shown in Fig. 3, a valve body 68 having a chamber 69, a valve 70 therein and having reliefs 71 and 72, and a crank 75 and a link 76 that is to be connected to an actuator or a manipulator pedal such as the pedal 27 shown in Fig. 3.

The valve body and the cylinder further have a port 80 that is to be connected to an intake manifold such as designated at 9a in Fig. 3, through pipe 81, a port 82 open to atmosphere, and ports 83 opening into the chamber and connected to each other by a passage 84 and to the cylinder by a port 85.

In this form of actuator, when the engine is running, the plunger is normally at the left end of the cylinder, in clutch disengaged position. When the manipulator pedal is depressed, a main bleeder path through port 82, relief 72, port 83, passage 84, and port 85 is opened, and the pressure medium (atmosphere) bleeds into the cylinder, to allow the clutch to move into engagement under the action of the clutch return spring.

The quick acting means, including parts 41—46, inclusive, and 50—53, like those similarly numbered on Figure 1, is connected to pipes 90, one of which is open to atmosphere, and the other of which is open to the actuator cylinder 60. Its piston 42 is normally down, to close the auxiliary bleeder path through pipes 90, but may be elevated by the spring 51 when engine suction fails, due to quick opening of the throttle. So elevated, it establishes an auxiliary path through which pressure medium (atmosphere) may pass into the actuator cylinder for rapid actuation of the clutch.

It will be observed that the construction is such that clutch actuation takes place at normal speed when the throttle is opened at a normal speed, regardless of the distance to which the throttle is advanced. However, when the latter is advanced quickly and fully, as in an emergency, the rate of clutch engagement will be more than is normally the case.

While the quick acting mechanism has been disclosed in connection with but two forms of actuators, in one of which (Fig. 1) pressure medium bleeds out for clutch actuation, and in the other of which (Fig. 2) pressure medium bleeds in for clutch actuation, it might well be used in connection with other forms of actuators, without departing from the scope of the original invention.

It will be observed that while in the forms shown, the actuators are of the vacuum type and connected to the engine, variations might be suggested, it mattering not, for this invention, which type of actuator be used.

Further, while but one form of quick acting mechanism has been disclosed, it will be understood that other forms may be devised, and accordingly, it is to be understood at this time, that the invention is to be limited, not to the specific embodiment here shown, but to such devices as may be considered to come within the scope of the claims which follow.

What I claim is:

1. In an automotive vehicle, an engine, a throttle therefor, a clutch actuator operatively connected to the engine suction line and to atmosphere and operable, for clutch disengagement by and upon the creation of a difference in pressure between the medium in the line and the atmosphere, an actuator manipulator, means operatively connecting the manipulator and the actuator for permitting operation of the former to open a bleeder path for equalizing the difference in pressure in the actuator and thereby to permit the actuator to operate for clutch engagement at a predetermined rate of movement, means providing a second bleeder path for the actuator, means normally influenced by suction in the engine suction line for closing the second bleeder path but operable, upon a failure of suction in the line due to rapid operation of the throttle, to open said second bleeder path, thereby to permit rapid clutch engagement operation of said actuator by providing auxiliary means for equalizing the difference of pressure in said actuator.

2. The combination with a clutch having means normally urging the same to engaged position, of a power actuator for moving said clutch to disengaged position, said actuator including a cylinder, a plunger slidable in said cylinder and connected to and influenced by said clutch engaging means, means for creating a differential pressure in said cylinder on opposite sides of said plunger to move the same to disengage said clutch, bleeder means for permitting equalization of pressure in said cylinder on opposite sides of said plunger, the rate of bleeding defining the rate of movement of said plunger as a result of the urge of said means for moving said clutch, and a valve controlled by-pass, opening into said cylinder on opposite sides of said plunger.

3. In an automotive vehicle having an engine and a suction line, a clutch, means for moving said clutch into its engaged position, a clutch actuator operable to move said clutch to disengaged position, a throttle, control means for said actuator connected to and operable simultaneously with opening of said throttle for permitting movement of said actuator at a predetermined rate in response to the urge of said means for moving said clutch to its engaged position, and normally inoperative means connected to the engine suction line and to said actuator and operable, in response to reduction of engine suction due to rapid throttle opening, for permitting clutch engagement movement of said actuator at a rate greater than said predetermined rate of movement.

4. The combination with an automotive vehicle having an engine, an intake manifold, a throttle, a throttle manipulator, a clutch, and means normally urging said clutch towards clutch engaged position, of a power actuator including a plunger reciprocally mounted therein and connected to and influenced by said means for moving said clutch to engaged position, means for connecting said intake manifold on one side of said plunger, means for connecting said actuator to the atmosphere on the other side of said plunger to create an unbalanced pressure tending to move said plunger against the urge of said means for moving said clutch, bleeder means for providing communication between parts of said actuator on opposite sides of said plunger, said bleeder means being connected to said throttle manipulator and operable simultaneously with said throttle, and an auxiliary bleeder controlled by suction in said intake manifold and adapted to supplement the action of said first named bleeder means.

5. A device of the character described including a power actuator connected to a clutch whereby upon actuation of the same said clutch is disengaged, means for normally urging said clutch towards engaged position, said actuator being operable by differential pressure therein to disengage said clutch, said actuator being adapted to permit clutch re-engagement by equalization of pressure in said actuator, said actuator being connected to the intake manifold of an automobile engine and to the atmosphere, a bleeder valve for permitting equalization of pressure in said actuator at a predetermined rate, a personally controlled manipulator for operating said bleeder, and an auxiliary bleeder connected to and subject to the suction in said intake manifold.

TRACY BROOKS TYLER.